United States Patent
Thomas et al.

[11] Patent Number: 5,936,234
[45] Date of Patent: Aug. 10, 1999

[54] SEED PLANTER MONITORING SYSTEM WITH OPTICAL SENSORS

[75] Inventors: John C. Thomas, Fargo; John D. Paulson, West Fargo; Jon T. Jacobson, Fargo; Paul R. Bramel, Fargo; Jason J. Wanner, Fargo; Daryl N. Roehrich, West Fargo; Karl-Heinz O. Mertins, Fargo, all of N. Dak.

[73] Assignee: Deere & Company, Moline, Ill.

[21] Appl. No.: 08/858,393

[22] Filed: May 19, 1997

Related U.S. Application Data

[63] Continuation-in-part of application No. 08/441,247, May 15, 1995, Pat. No. 5,650,609.

[51] Int. Cl.$^6$ .................................................. G01V 9/04
[52] U.S. Cl. ............................................. 250/222.2; 377/6
[58] Field of Search .......................... 250/222.2, 223 R, 250/559.4, 214 R; 377/6, 53; 221/174

[56] References Cited

U.S. PATENT DOCUMENTS

| | | |
|---|---|---|
| 3,723,989 | 3/1973 | Fathauer et al. ............... 250/222.2 |
| 3,974,377 | 8/1976 | Steffen . |
| 4,163,507 | 8/1979 | Bell . |
| 4,555,624 | 11/1985 | Steffen . |
| 4,634,855 | 1/1987 | Friend et al. . |
| 5,635,911 | 6/1997 | Landers et al. . |

*Primary Examiner*—Que T. Le
*Attorney, Agent, or Firm*—Arnold International; Bruce Y. Arnold

[57] ABSTRACT

A seed monitor includes a planter master unit having one or more planter counting units connected to the planter master unit, with each planter counting unit associated with a different seed tube. Each planter counting unit includes a light source, a means for forming a light beam that traverses a sensing area of a seed tube, a detector and a processor. The circuit board connects the detector and light source with a processor. The processor adjusts the intensity of the light source and selects an output amplifier gain that is appropriate for the counting of seeds. In this manner, the planter monitoring system adjusts for long-term dust and dirt accumulation and aging of components. The processor processes the selected stage of amplified output from the detector and determines the number of seeds that have traversed the sensing area of the associated seed tube. The planter master unit receives binary data of the counted seed, and from this data, provides an output to the operator. In a preferred embodiment, plural planter counting units are connected to the planter master unit in a series connection.

12 Claims, 11 Drawing Sheets

SEED PLANTER MONITORING SYSTEM WITH OPTICAL SENSORS

CROSS-REFERENCE TO RELATED APPLICATION

This is a continuation-in-part of allowed U.S Utility patent application Ser. No. 08/441,247 filed May 15, 1995 now U.S. Pat. No. 5,650,609, entitled "Seed Monitoring System for Counting Seeds As They Are Dispensed Through a Seed Planting Tube".

BACKGROUND OF THE INVENTION

1. Field of the Invention

This invention relates generally to a discrete particle counter employing a uniform beam of collimated light, and more particularly, to a seed monitor for counting seeds dispensed by a seed planter through a plurality of seed tubes. The seed monitor includes a planter master unit having one or more planter counting units connected to the planter master, each associated with a different seed tube.

A problem associated with seed monitoring using light (herein, the term light refers to visible, infrared and ultraviolet radiation) is the severe dust and dirt associated with the planting process. Cleaning of the optical components is not considered a viable option because of the large number of seed tubes on modern planters. This is because the effects of any single cleaning might be short-lived, resulting from the extremely dusty environment within the seed tube during a seeding operation. Also, because cleaning would probably need to occur when the seed tube was not in use, cleaning would decrease the availability of the planting equipment during a planting season.

Another problem associated with seed monitoring using light is the detection and accurate counting of multiple seeds that pass simultaneously through the sensing area of the seed tube, either individually or as clumps of seeds.

2. Discussion of the Prior Art

As is well understood, it is important to monitor the quantity of seeds that are being planted into a planting row, especially in a high capacity agricultural environment such as a farm where the seeds are corn seeds, soy bean seeds and the like. Planting too many seeds causes the resulting plant product to be too closely spaced together to allow for proper plant growth, thus affecting the crop yield. Planting too few seeds reduces the effective use of the planting area. For high output planting, industrial seed planters have been devised to plant a high volume of seeds relatively quickly. To ensure that the proper number of seeds are planted by the seed planters, a seed monitoring system is generally provided that counts the seeds as they are dispensed through seed tubes associated with the planter. A typical planter will have many seed tubes for planting a multitude of planting rows simultaneously.

One type of seed monitoring system incorporates optical devices that generate an optical beam directed across the seed tubes, and optical sensors that are sensitive to the loss of light intensity caused by seeds interfering with the optical beam. An electrical counting circuit monitors the occurrences of loss of light intensity to provide a count of the seeds. Various optical seed monitoring systems of this type are disclosed in U.S. Pat. Nos. 3,974,377 issued to Steffen; 4,555,624 issued to Steffen, and 4,163,507 issued to Bell.

These and other optical seed monitoring systems have been inaccurate for various reasons. One inaccuracy results from spatial nonuniformity of the optical beam that senses the seeds. Because of spatial nonuniformity, the intensity of an optical beam varies, depending upon the location within the optical beam. Therefore, the ability of the optical sensor to detect the interruption of the optical beam by the seeds varies depending on the location of the seeds within the beam. Consequently, the optical sensor may not adequately detect seeds dropped through certain locations in the seed tube.

One prior art seed monitoring system has attempted to address spatial nonuniformity of the optical beam of a seed sensor by proposing an optical device that generates a trapezoidal cross-section optical beam. However, the trapezoidal cross-section creates an undesirable spatial restriction for groups of seeds as they are dropped through the seed tube. U.S. Pat. No. 4,634,855 issued to Friend et al. also discloses an attempt to create an optical beam of high uniformity. However, this proposed solution is of such a complexity that the feasibility for commercial success is limited.

Another drawback of the known optical seed monitoring systems occurs when the seed sensors are associated with circuitry that counts pulses when the optical beam is interrupted by the seed. This may result in a count inaccuracy because a plurality of seeds may simultaneously traverse the optical beam and be counted as a single seed. A related problem is that the accuracy of the known optical monitoring systems tend to deteriorate with increasing planting speed, with higher seed populations per acre, and with small grains and seeds. These optical systems may be incapable of sufficiently rapid response to reliably count each seed.

Still another drawback of the known optical seed monitoring systems is the complexity, cost, and stocking requirements of their wiring components. The wiring harnesses of the seed tube monitors tend to each be connected to the planter master unit, and thus are unnecessarily complex and ill-suited to a planting operation that monitors less than a full system complement of seed tubes. This results in unneeded expense in stocking wiring components of different lengths as well as a waste of money for an operator who chooses to use fewer seed monitoring units than seed tubes.

What is needed is an optical seed monitoring system that effectively counts each dispensed seed, even at high planting rates, and does not suffer from the drawbacks as discussed above. It is therefore an object of the present invention to provide an optical seed counter capable of counting individual seeds at high seed planting rates, even after long-term accumulation of dust and dirt within the seed planting tubes.

BRIEF SUMMARY OF THE INVENTION

A first object of the present invention is to enable the accurate counting of seeds by a seed monitoring system that employs a uniform, collimated beam of light which is partially obscured by one or more seeds passing through a sensing area of a seed planting tube.

A second object of the invention is to increase the immunity of the system to electrically induced noise by employing digital data signals between the planter counting units and the planter master unit.

A third object of the invention is to increase the signal/noise ratio of the seed monitoring system (as compared to the system of the parent application) by reducing loss of light from the light source to the seed sensing area and loss of light from the seed sensing area to the detector.

A fourth object of the invention is to adjust both the light source intensity and the amplification level of the detected signal so as to enable the accurate counting of seeds during the life of the equipment, i.e., from being new and clean to old with long-term accumulations of dust and dirt on the equipment.

Additional objects, advantages and features of the present invention will become apparent from the following description and appended claims, taken in conjunction with the accompanying drawings.

BRIEF DESCRIPTION OF THE DRAWINGS

The present invention will become more fully understood from the accompanying drawings and detailed description which are given by way of illustration only, and thus are not to be interpreted as limitative of the invention, and wherein.

DETAILED DESCRIPTION

The following description of the preferred embodiments concerning an optical seed planter monitoring system is merely exemplary in nature, and is in no way intended to limit the invention, its application or uses.

Figure 1:
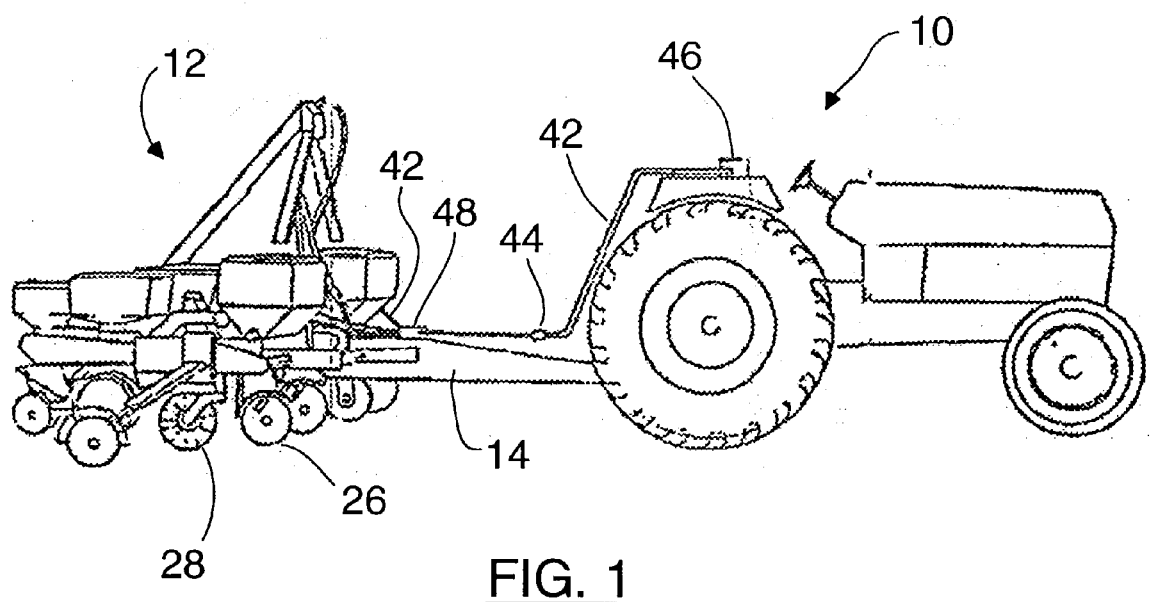
FIG. 1 is a side view of a tractor towing a seed planter including a seed monitoring system according to an embodiment of the present invention.

FIG. 1 shows a side view of a tractor 10 intended to represent various types of farm tractors that perform various tasks in a high volume agricultural environment as would be present on a farm. In the depiction of FIG. 1, the tractor 10 is towing a multiple row seed planter 12 by a tow bar 14. The seed planter 12 creates multiple parallel furrows in the soil of a field area (not shown) to be planted, dispenses a controlled quantity of spaced apart seeds into the furrows, and then covers the furrows in a manner that allows the seeds to germinate and become plants. The seed planter 12 is intended to represent various known types of seed planters that are capable of planting many rows of seeds simultaneously. These can simultaneously plant up to numerous, parallel-configured rows of crops. As will be appreciated by those skilled in the art, the seed planter 12 can further represent many other types of seed planters including those that can be mounted to a rear or front hitch of the tractor 10 in either a 3-point or semi-mounted (2-point) configuration.

Figure 2:
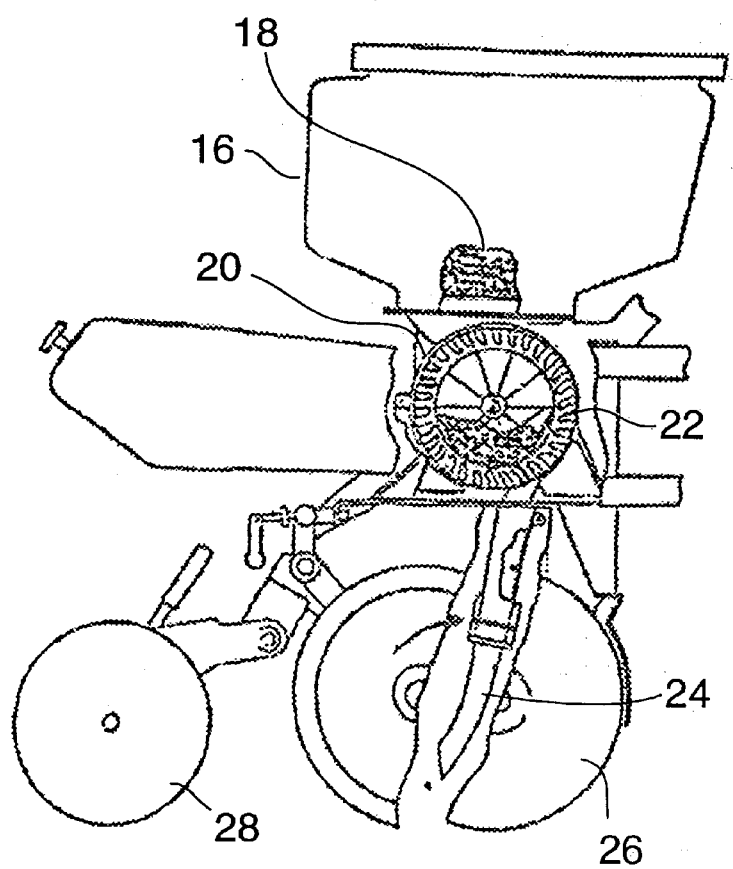
FIG. 2 is a cut-away sectional view of the seed planter of FIG. 1, showing a seed tube dispensing seed.

FIG. 2 shows a cut-away side view of a portion of the seed planter 12. The seed planter 12 includes a hopper 16 that stores a quantity of seeds 18 to be planted. The seeds 18 are loaded into a rotary mechanism 20 from the hopper 16. The rotary mechanism 20 includes a series of equally spaced cavities 22 so as to selectively dispense the seeds 18 into a seed tube 24. An assembly of disc openers 26 rotate as the seed planter 12 is towed by the tractor 10 to create the furrows in the plant area. As the seeds 18 are dispensed into the furrows, a closing wheel assembly 28 covers the furrows with dirt. The rotation of the mechanism 20 may be geared to the rotation of ground drive wheel assemblies (not shown) such that the seeds 18 are dispensed into the furrows at a rate that depends on the towed rate of the seed planter 12, or the seeds may be dispensed at a user selectable rate that is independent of ground speed.

Figure 3A:
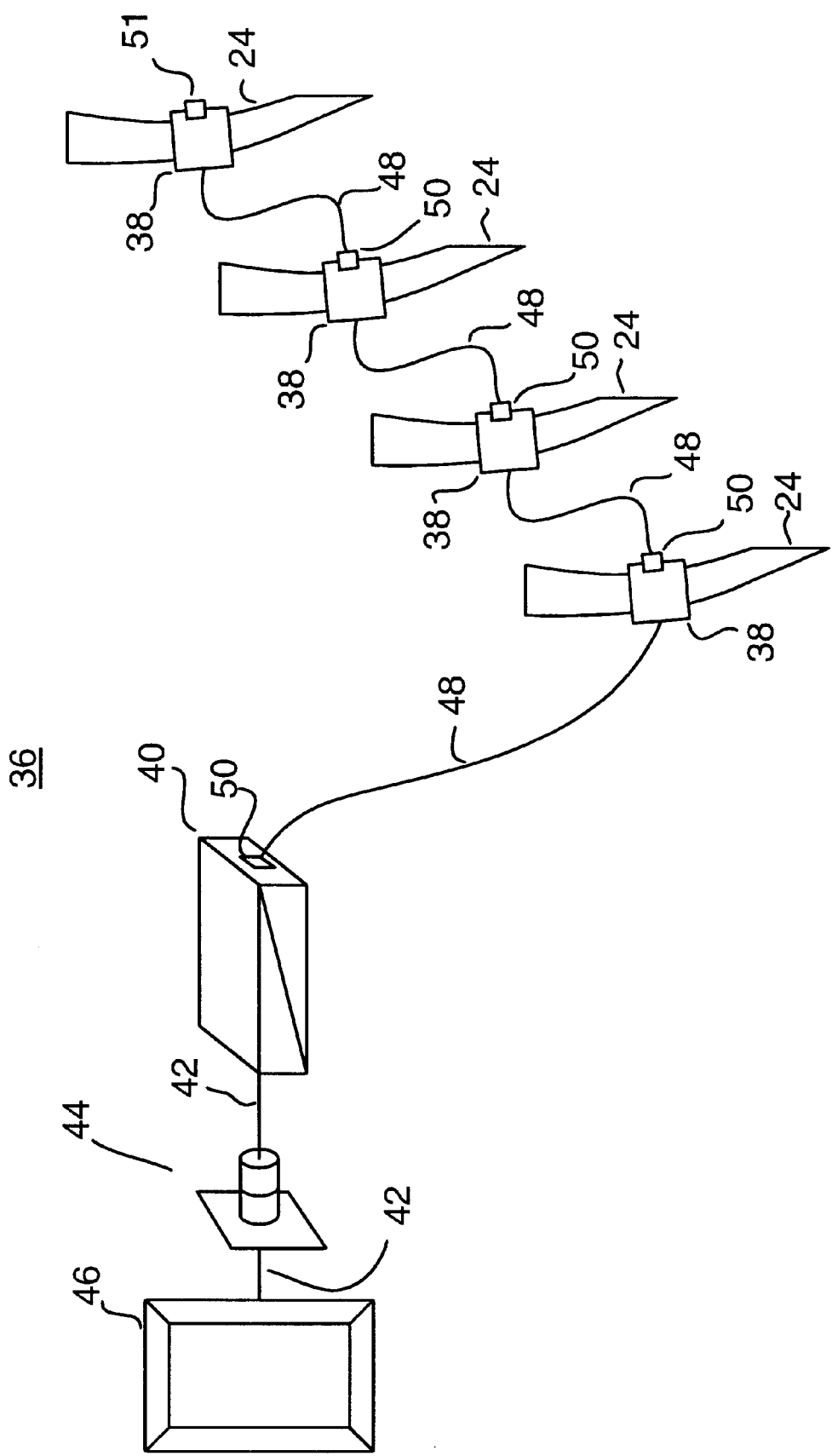
FIG. 3(a) illustrates the serial linkage of the planter counting units to the planter master unit in the case where all of the cables 48 are not of uniform length.
Figure 3:
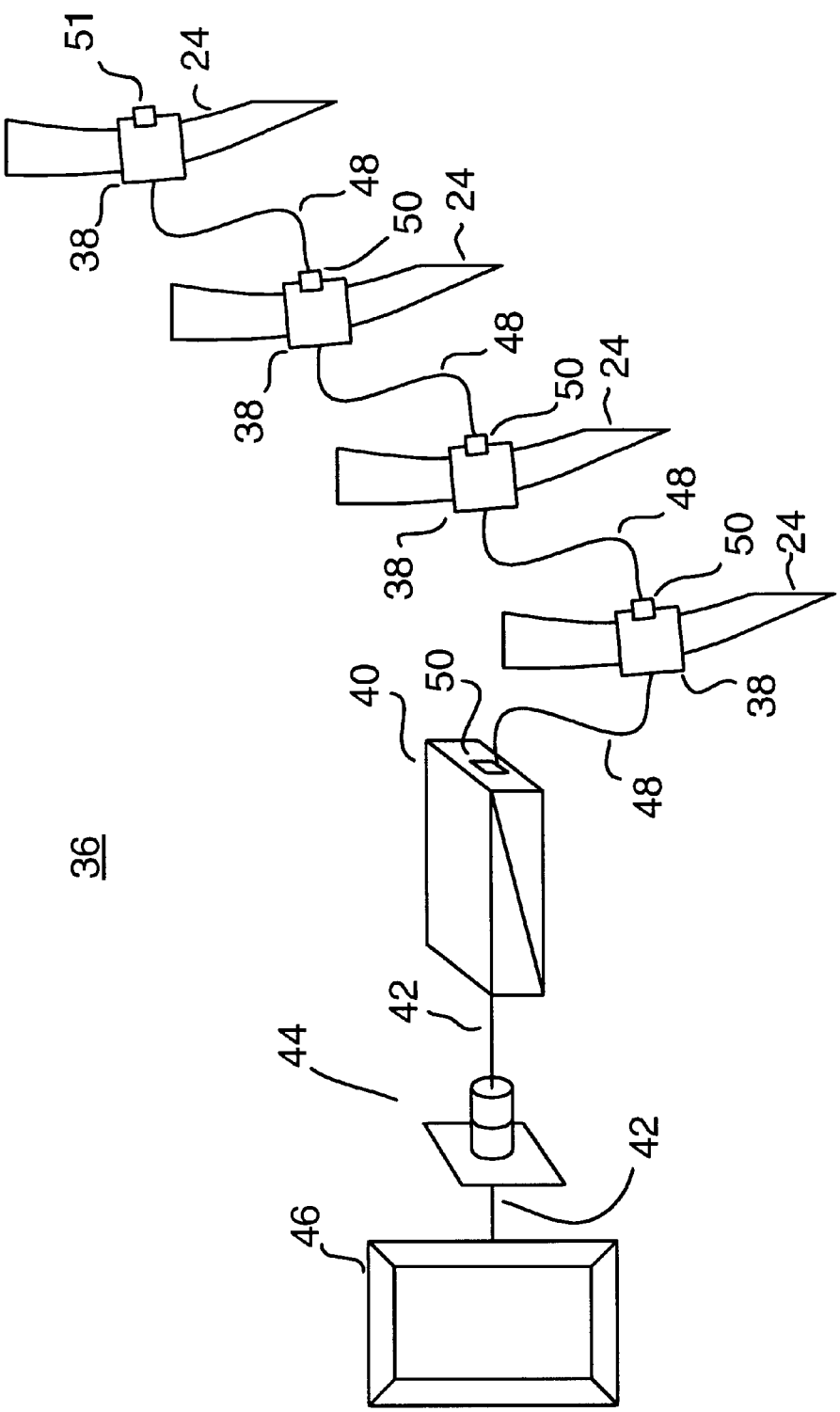
FIG. 3(b) illustrates the serial linkage of the planter counting units to the planter master unit in the case where all of the cables 48 are of uniform length.

As illustrated in FIGS. 3(a) and 3(b), the various planter counting units 38 are components of a seed monitoring system 36 that is used in association with the seed planter 12 to count the seeds that are dispensed into the seed tubes 24 so as to ensure that the proper number of seeds are being planted to avoid under planting and over planting. The seed monitoring system 36 is shown separated from the tractor 10 and the seed planter 12 illustrated in FIGS. 3(a) and 3(b). Only four seed tubes 24 are shown in FIG. 3. However, it will be appreciated by those skilled in the art that the number of seed tubes 24 can vary depending on the particular seed planter being used.

The planter counting units 38 are associated with respective seed tubes. In a preferred embodiment, the planter counting units are mounted to and supported by the respective seed tube. This enables both a higher signal level of illuminating light and less attenuation of the received light signal, due to eliminating or reducing the length of electrical or fiber optic cable to the light source or the emitting side of the sensing area of a seed tube and from the sensing area to the large area detector. It also results in both a higher signal strength and less noise being induced on the analog signal that is output from the large area detector (i.e., before such signal is A/D converted), since the length of run of the analog signal is very short. One advantage of the present invention over the known prior art is that the seed monitor signals between the seed tubes and between the seed tubes and the planter master unit are digital in form, and thus highly immune to noise.

As will be discussed in greater detail below, each planter counting unit 38 includes a means to form a uniform, collimated optical beam across the seed tube 24 so that, as the seeds are dropped through the seed tube 24, they obstruct a portion of the optical beam flux to cause a change in output of a light detector that is indicative of the size and quantity of the seeds. The individual planter counting units are connected to a planter master unit 40. The planter master unit 40 processes binary count data received from the planter counting units and provides various information via a cable 42 and hitch point connector 44 to a data output, such as a display 46 located on the tractor 10.

The planter master unit 40 may receive its power from the tractor via cable 42. Each planter counting unit 38 may have a cable 48 and connector permanently attached for connecting to the planter master unit. In a preferred embodiment, each planter counting unit has a connector 50 for serially connecting wires in cable 48 to the planter master unit 40 or another planting counting unit. Further, each planter counting unit has a connector interface 51 for receiving a connector of a different planter counting unit, thereby connecting the planter counting units serially to the planter master unit. Depending on the mounting location of the planter master unit, this enables all of the planter counting units to have a single length cable 48 (FIG. 3(b)), thus minimizing the number of parts that must be stocked to maintain seed monitoring system 36 in the field.

Figure 4:
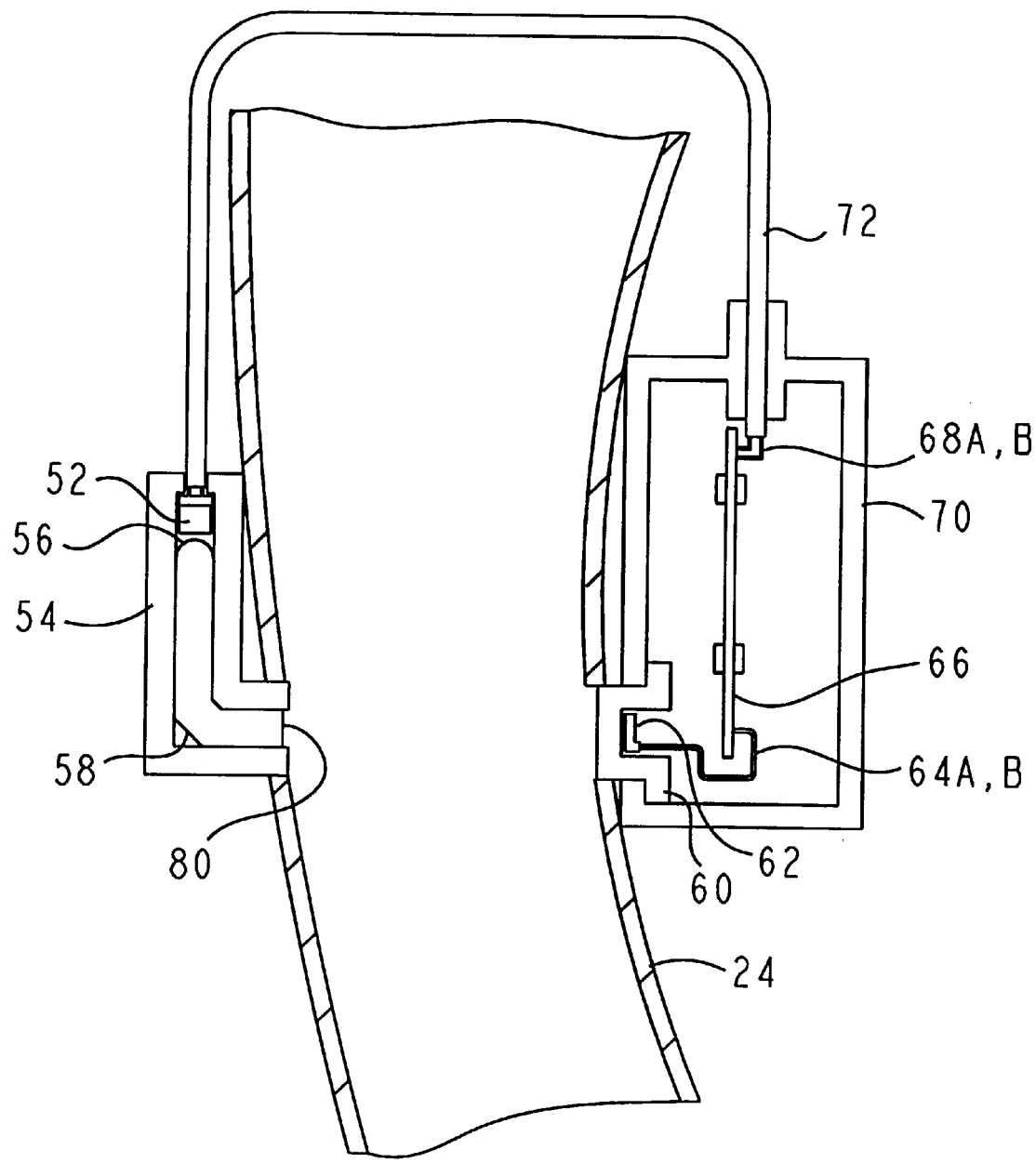
FIG. 4 is a cut-away, vertical sectional view of a portion of the seed tube shown in FIG. 2, illustrating the preferred embodiment of planter counting unit which does not employ an optical fiber.

In FIG. 4 is illustrated a first, preferred, embodiment of planter counting unit. In this embodiment an LED 52 is mounted in an emitter enclosure 54 which supports a lens 56 that collimates the light from LED 52 in a first direction. Lens 56 may be a cylindrical lens, or even an aspheric lens that is shaped very similarly to a cylindrical lens but with slightly less curvature for marginal rays to account for the LED 52 output being an extended source rather than a point source of light. Lens 56 is made integral with a folding prism 58. Emitter enclosure 54 supports the LED 52 at the focal distance of lens 56 so as to direct a uniform beam, collimated in a first direction, to the folding prism 58. The light is then collimated in a second direction by lens 80, the focusing power of which is crossed 90 degrees to that of lens 56, thus forming a fully collimated beam which illuminates the sensing area of the seed tube 24. Lens 80 may be a cylindrical lens, or even an aspheric lens that is shaped very similarly to a cylindrical lens but with slightly less curvature for marginal rays to account for the LED 52 output being an extended source rather than a point source of light. The crossed lenses 56 and 80 are more clearly illustrated in a later figure.

On the opposite side of the seed tube is mounted a protective window 60 having a large area detector 62 glued thereto and connected by wires 64A,B to a circuit board 66. Circuit board 66 includes a microprocessor and other components (not illustrated in FIG. 4) for counting seeds as well as for adjusting the voltage provided to LED 52, as will be discussed in more detail in conjunction with a different figure. Protective window 60 not only supports large area detector 62, but it also protects the surface of the detector from abrasion by seeds passing down the seed tube 24. Wires 68A,B connect LED 52 to the circuit board 66. Seals, made of soft plastic, (not shown) seal the protective coating 72 of wires 68A, B to the detector enclosure 70 and to the emitter enclosure 54.

Detector enclosure 70 supports the protective window 60, circuit board 66 and protective coating 72. Protective coating 72 may instead be a conduit or tube that seals with emitter enclosure 54 and detector enclosure 70 so as to provide a dust and liquid resistant environment to LED 52, circuit board 66, and large area detector 62, which measures the flux of the received light beam. The tube 72 may be electrically conductive to shield the wires 68A,B from induced voltages.

Figure 5:
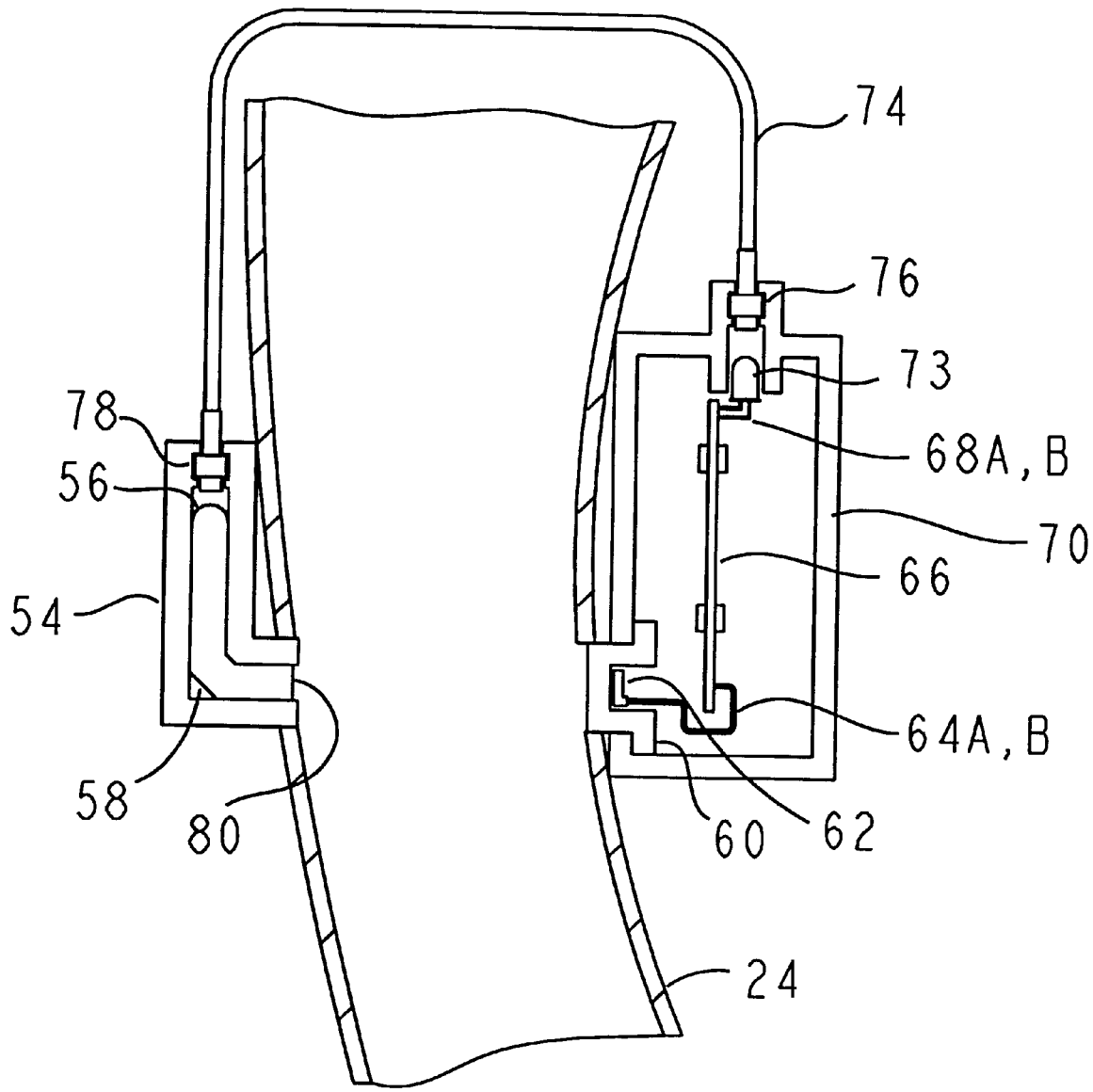
FIG. 5 is cut-away, vertical sectional view of a portion of the seed tube shown in FIG. 2, illustrating a portion of an alternative embodiment of planter counting unit which employs a short length of optical fiber.

FIG. 5 illustrates a portion of an alternative structure to that illustrated in FIG. 4, wherein an LED 73 is mounted within the detector enclosure 70, and an optical fiber conveys the light to the emitter side of the seed tube 24. Detector enclosure 70 in this embodiment supports LED 73 so as to be in alignment with the end of optical fiber 74. The optical fiber 74 is a plastic, single cable, multi-mode optical fiber. Plastic optical fibers are preferred over glass optical fibers because of a number of advantages, including high flexibility, easy cutting and termination, and low cost. Single cable optical fibers have been selected over optical fiber bundles for simplicity and low cost reasons.

A typical optical fiber of the type described herein will include a core region, a cladding region surrounding the core region, and an outer jacket material. The cladding region has a slightly lower index of refraction than the core region. Light rays that are emitted into the core region at or below a maximum angle are substantially reflected at the core/cladding barrier so as to propagate down the optical fiber. In one specific embodiment, the plastic material of the core and cladding region is polymethyl methacrylate (PMMA) and the outer jacket material is black polyethylene. Optical fibers of this type are available from AMP, Inc., Harrisburg, Pa. as part nos. 501232-5 and 501336-1. However, as will be appreciated by one skilled in the art, different plastics or glass could be used for the optical fibers without departing from the scope of the invention.

Omitted from FIG. 5 is the permanently affixed cable 48 with attached connector 50 (illustrated in FIG. 3), as well as the connector interface 51 (illustrated in FIG. 3) for receiving the connector of a subsequent, serially-connected, planter counting unit.

Receiver ferrule 76 and emitter ferrule 78 each have a longitudinal seating surface on an increased diameter portion of the ferrule. Each ferrule also has a longitudinal through-hole comparable in diameter to that of the optical fiber. The ferrules 76 and 78 are slipped over the ends of the optical fiber 74 and a portion of each ferrule is crimped to the optical fiber using a crimp collar which compresses the ferrule against the respective optical fiber. Detector enclosure 70 and emitter enclosure 54 are sealed to the ferrules 76 and 78 so as to resist liquid and dust from entering into the enclosures either by means of being potted or by means of a rubber seal (not illustrated). Emitter ferrule 78 is positioned with the end of the optical fiber 74 one focal length from cylindrical emitter lens 56 so that a uniform, collimated beam of radiation in the sensing area is produced.

Figure 6:
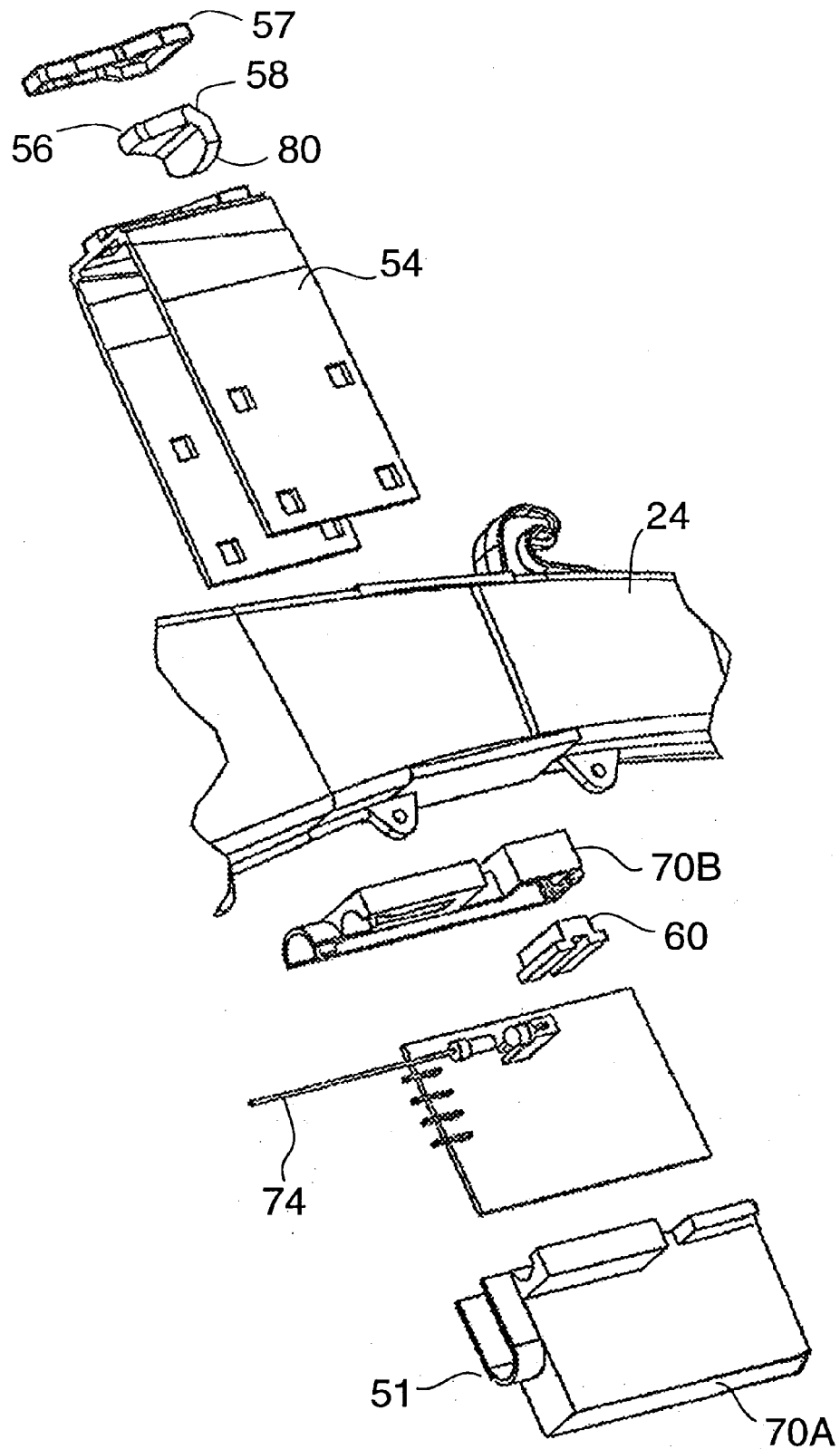
FIG. 6 is a perspective, exploded view of a portion of the structure illustrated in FIG. 5, including a depiction of a connector interface for serially connecting the planter counting units to the planter master unit.

FIG. 6 illustrates, in perspective view, the crossed cylindrical emitting lenses 56 and 80 and beam folding prism 58 which function to collimate and direct the beam to the seed sensing area of the seed tube 24. In the illustrated embodiment, lenses 56 and 80 as well as folding prism 58 are integrally formed of an injection molded plastic. A cover 57 protects these optics from intrusion of dust and dirt. As apparent to those skilled in the art, individual optical components could be readily substituted for the single piece of plastic illustrated, or a single collimating lens could be used (with or without folding optics, depending on the designer's preference) without affecting the function or operation of the planter counting unit 38 (FIG. 2). Also shown in FIG. 6 is the seed tube 24 with the detector enclosure parts 70A, 70B. In this figure, connector interface 51, for receiving connector 50 (FIG. 3) of a subsequent, serially-connected planter counting unit, is illustrated.

Figure 7:
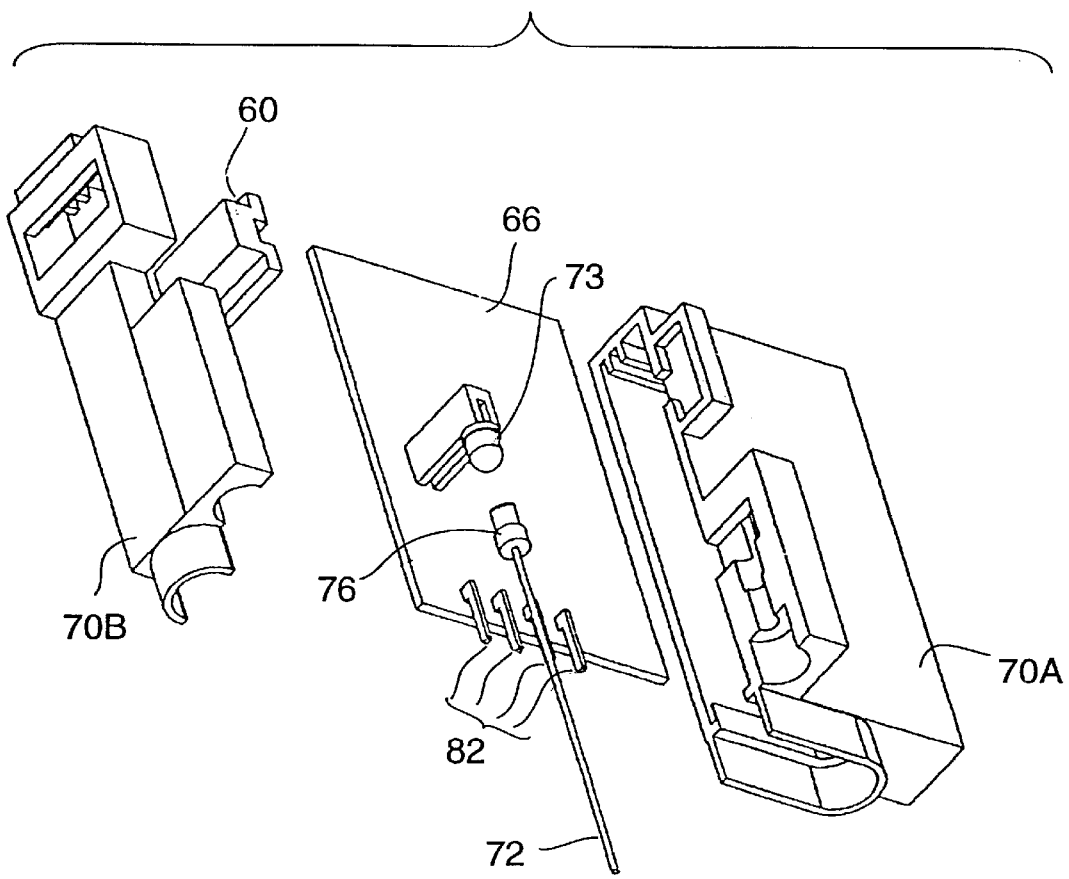
FIG. 7 illustrates, from a different perspective, an exploded view of a portion of the structure illustrated in FIG. 6.

In FIG. 7, detector enclosure portions 70A and 70B (that, together, form detector enclosure 70 of FIG. 5) are illustrated in exploded view. Also illustrated is circuit board 66 supporting LED 73 in alignment with receiver ferrule 76. In this figure, the four terminals 82 for connecting the power, ground, clock and data wires of a subsequent, serially connected planter counting unit are clearly illustrated.

Figure 8:
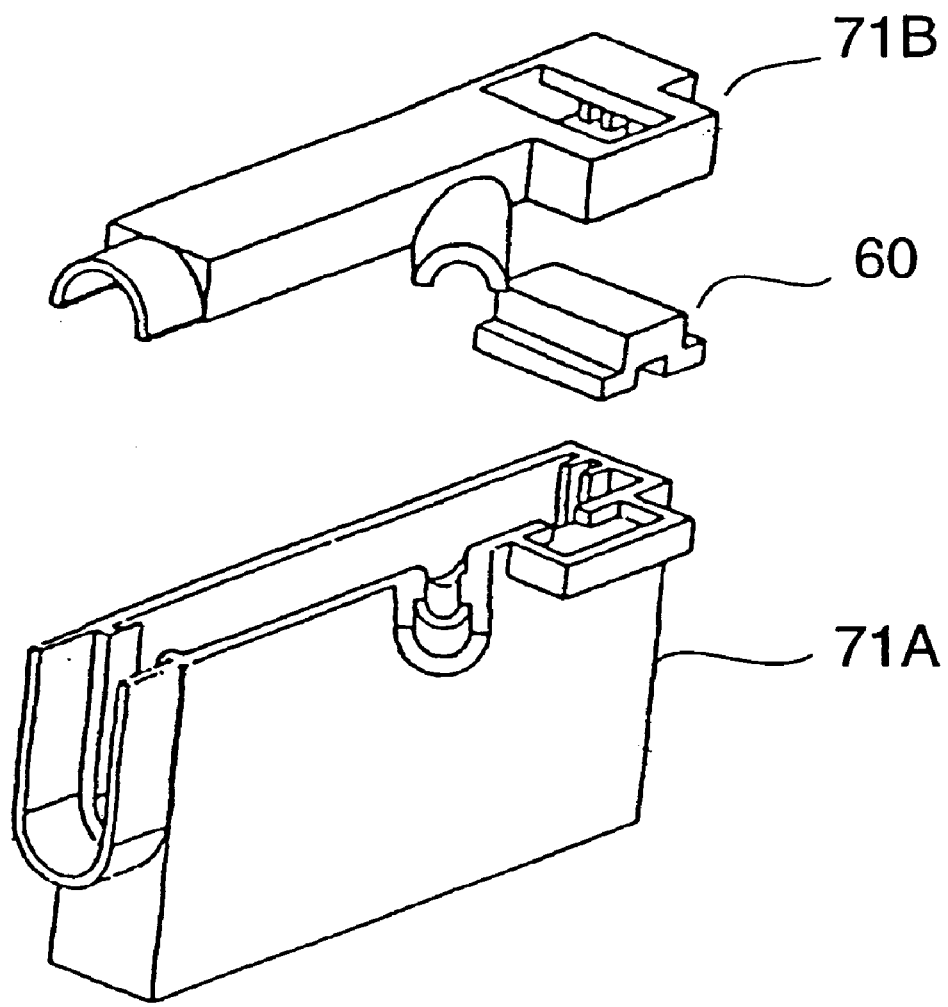
FIG. 8 illustrates an alternative design of detector enclosure to that illustrated in FIG. 6. This design positions the entry point of the optical fiber or electric cable to the detector enclosure remote from the connector interface, thereby reducing the possibility that the optical fiber or electric cable will be stressed when a connector is attached to or detached from the connector interface.

In FIG. 8 a detector enclosure 71, which is an alternative (to the detector enclosure 70 illustrated in FIGS. 4 and 5, is illustrated. In this alternative design, the connection of the wires 68A,B (FIG. 4) or optical fiber 74 (FIG. 5) to the detector enclosure 71 is located in the middle portion of the detector enclosure. This enables the connector 50 to more easily be plugged into connector interface 51 (FIG. 3) of the detector enclosure 71, formed of the two portions 71A and 71B, without stressing the wires 68A,B or the optical fiber 74 (depending on which embodiment of the invention is in use).

Figure 9:
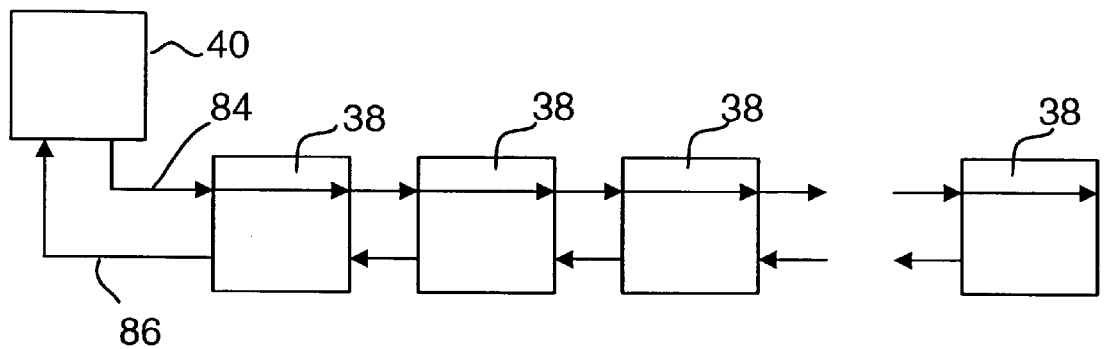
FIG. 9 is a block diagram illustrating a preferred serial connection of the planter counting units to the planter master unit.

Referring to FIG. 9, the serial connection of the planter counting units 38 to the planter master unit 40 is illustrated. For clarity of illustration, only the clock line 84 and the data line 86 have been illustrated. Not shown, but similarly wired in a series connection, are a power line and a ground line. Thus, all four of the terminals 82 illustrated in FIG. 7 are utilized. In operation, the master unit 40 places clock signals on clock line 84 and receives digital data signals representing the number of seeds that have been counted by each of the planter counting units 38 in a given time interval on data line 86. The planter counting units 38 place the digital signals, representing the number of seeds counted during a time interval, sequentially onto the data line 86 in response to the clock signals, as will be described below. Master control unit 40 contains a microprocessor which puts clock signals on the clock line 84 and receives the digital data that is sequentially clocked in on the data line 86. The microprocessor in the master control unit then processes the signal in a manner which depends on the particular application of the planter counting unit and displays the results of the counts from the various seed tubes in various formats useful to the operator.

Figure 10:
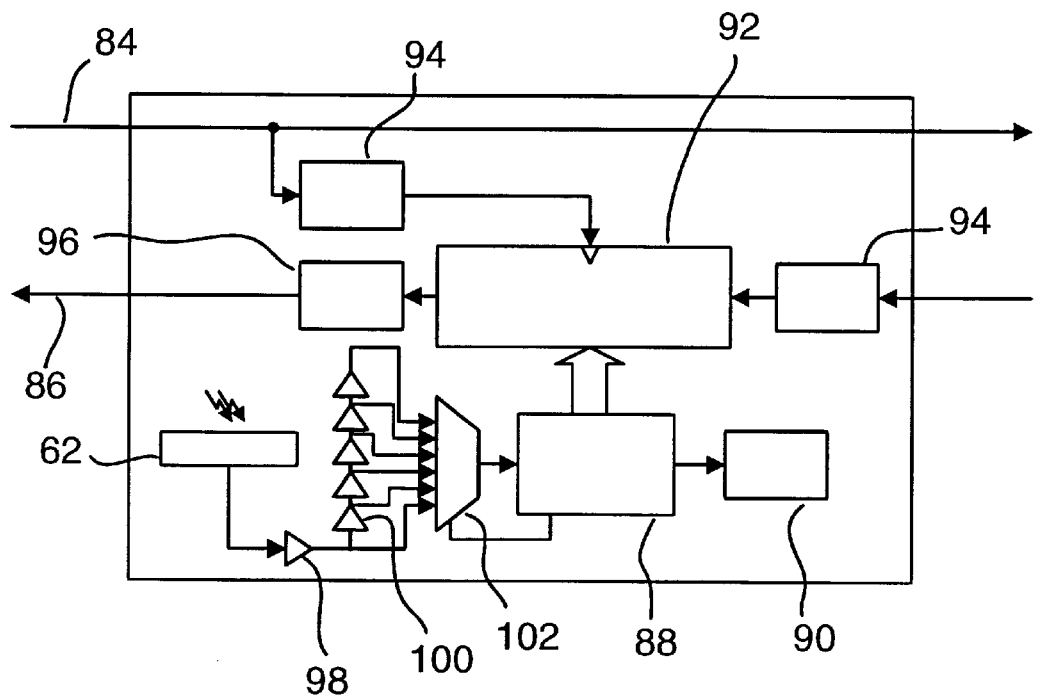
FIG. 10 is a block diagram showing the components within each planter counting unit illustrated in FIG. 9.

FIG. 10 illustrates, in block diagram form, an embodiment of a planter counting unit. The power and ground wires have again been omitted for clarity of illustration. It should also be noted that, although the components illustrated in FIG. 10 are connected to the circuit board 66, these components were not illustrated in FIGS. 4–6, for clarity of those figures. As those of ordinary skill in the art will appreciate, other components may be substituted in order to accomplish the same function as the components illustrated in FIG. 10.

Referring to FIG. 10, the following components are shown: a microprocessor 88 which analyzes the output of large area detector 62 and controls LED driver 90. Shift register 92, which may be a part of the microprocessor, receives digital data from the microprocessor representing the number of seeds that have been counted in the given time interval. This information is obtained by the microprocessor 88 receiving, as an input, data from multiplexer 102. Multiplexer 102 receives analog data from each of the amplification stages of a bank of amplifiers 100, in cascade connection, which amplify an analog signal received from the initial amplifier 98 to various degrees. Large area detector 62 inputs its signal to the initial amplifier 98.

It is, of course possible to omit multiplexer 102, which places the selected gain level signal onto an A/D input to the microprocessor 88. In case multiplexer 102 is omitted, it is required that the signals from the various gain stages of the cascade of amplifiers 100 be connected to separate A/D inputs of the microprocessor 88. Buffering circuits 94 buffer the received clock and data signals input to shift register 92 from the clock line 84 and the data line 86, respectively. Driver 96 places the output from the serial shift register 92, as controlled by clock line 84, onto the data line 86. (It should be noted, that buffer circuits 96 and driver 96 may not be needed in the event the number of planting rows are few in number). Thus, seed count data from the various, serially connected planter counting units 38 can be placed onto the data line in serial fashion by the clock signals on clock line 84.

In order to adjust the sensitivity of the planter monitoring system for varying output efficiency of the light source, for the type (i.e., size) of seed being monitored, for any accumulation of dust and dirt that decreases the intensity of the collimated beam, or for any decrease of sensitivity of the large area detector 62 due to aging, microprocessor 88 selects which of the levels of amplification of the cascaded amplifiers 100 to use when counting seeds. In the event a higher level of amplification results in the signal from the large area detector being clipped, a lower level of amplification is selected.

In the event the lowest level of amplification results in a clipped signal, microprocessor 88 decreases the pulse width of the signal applied to the LED driver 90, thereby reducing the current applied to LED 73 (FIG. 5) and lowering the intensity of the light beam that is output. The selection of amplifier gain level and the level adjust of the LED driver occur at fixed time intervals which are multiples of the time periods that seeds are counted. As one example, if the counting of seeds at each planter counting unit is performed each 2 milliseconds, the gain stage select may occur every 500 milliseconds.

Figure 11:
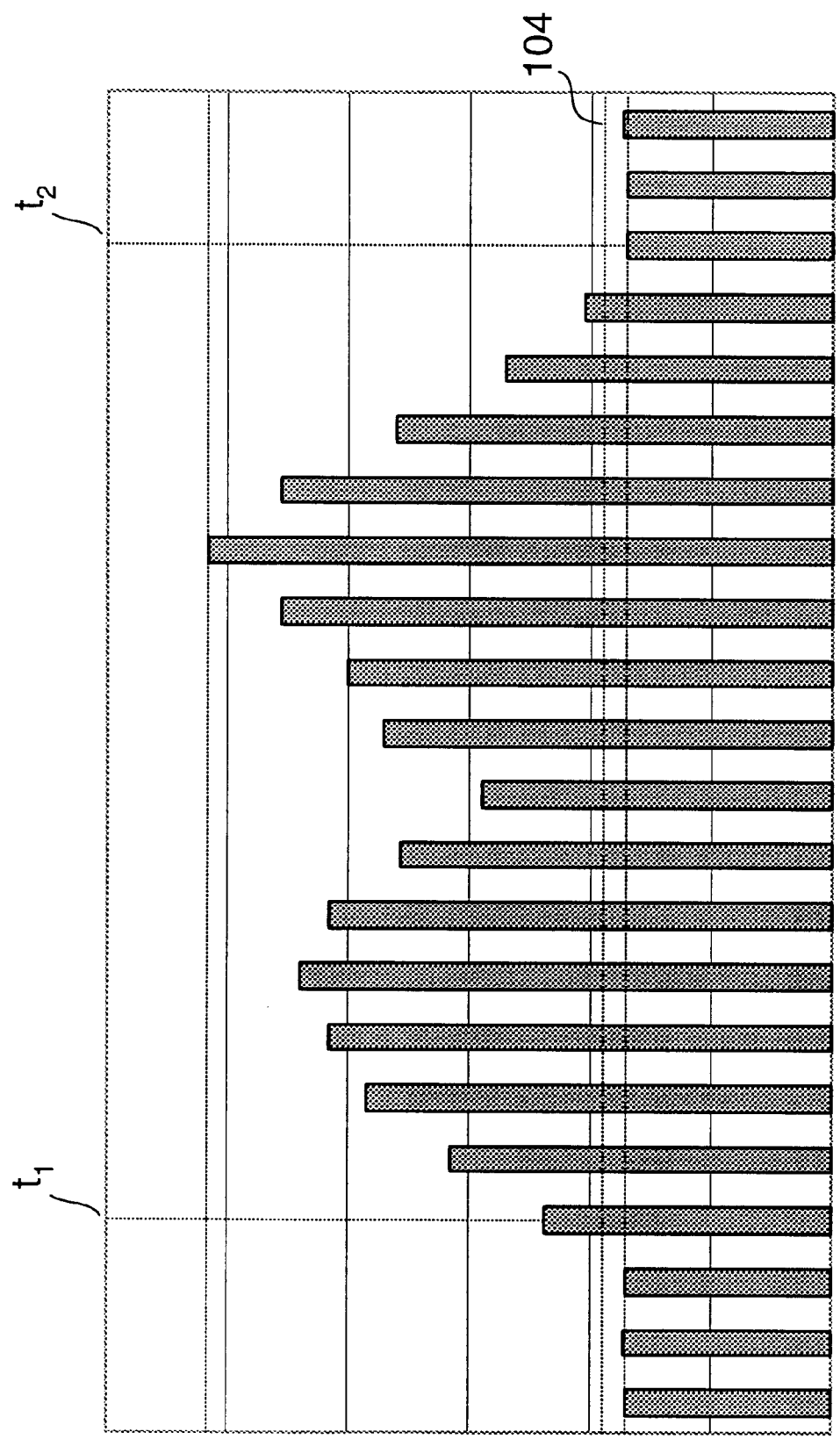
FIG. 11 is a bar graph depicting the intensity levels versus time of sequentially detected signals that are input to the microprocessor illustrated in FIG. 10 when two seeds sequentially pass through the sensing area of a seed tube; and, FIG. 12 is a bar graph depicting the intensity levels versus time of sequentially detected signals that are input to the microprocessor illustrated in FIG. 10 when a first seed passes through the sensing area of a seed tube, followed by two seeds simultaneously passing through the sensing area of a seed tube.

FIG. 11 is a bar graph depicting the intensity levels versus time of sequentially sampled and then A/D converted signals from the large area detector 62. By reversing the side of the large area detector that is grounded versus the side that is connected to amplifier 98, a decrease in the light incident on the large area detector by a seed appears as an increase in detected voltage from the large area detector output. Thus seed events appear as voltage peaks rather than voltage dips in FIGS. 11 and 12.

The microprocessor at each seed tube determines the number of seeds passing through the seed tube in a given time interval and passes this data to the master unit 40 via data line 86 by processing the A/D data from the large area detector. As a first example, the microprocessor 86 determines the peaks of the sampled signals that lie above a threshold level 104 within a time interval t2 minus t1 by counting the local maxima of the sampled signals. Thus, in the case illustrated in FIG. 11 having two local maxima of approximately the same height, the microprocessor 88 would pass the number two in digital form to serial shift register 92.

Figure 12:
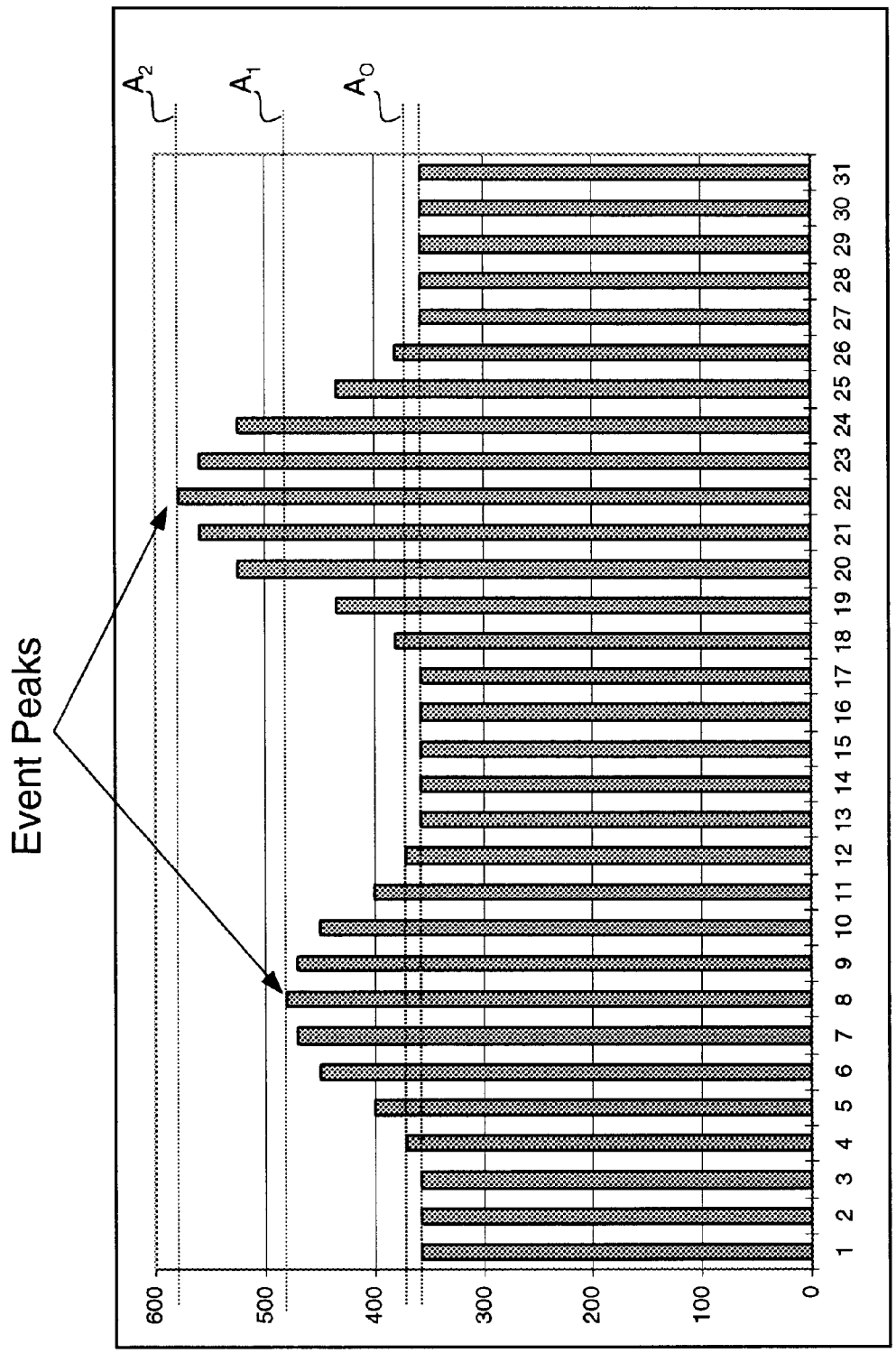

Referring to FIG. 12, the microprocessor maintains a running average peak amplitude A1 of the signal level of the seeds that are detected. In the event a peak signal level A2 is above the running average A1 by a certain percentage, (i.e., the peak A2 is 150% to 200% higher than the level A1 is to level A0, the value when no seeds are present in the sensing area, it is presumed that two seeds have simultaneously passed in front of the large area detector. Thus, the first local maxima in FIG. 12 would be counted as one seed, since it is near the running average change in signal level. However, the second local maxima, since its peak is in the range of 150% to 200% above the running average change in signal level, would be counted as two seeds. Thus, if the total period shown corresponded to the time period for counting the seed total and reporting it to the master unit (e.g., 2 milliseconds in the earlier discussion), the number of seeds reported in digital form would be three.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seed planter monitoring system having a master unit and a respective planter counting unit associated with two or more seed tubes of a planter, said planter counting units each comprising:

means to form a beam of light, said beam of light transiting a sensing area of a respective seed tube;

detector means to receive said beam of light and to form an electrical signal representative of the flux of the received beam of light;

amplifier means to amplify said electrical signal;

processing means to receive said amplified electrical signal, or a digital representation thereof obtained by A/D converting said amplified electrical signal, and to determine therefrom the number of seeds passing through the respective seed tube during a given interval of time; and, means to convey digital signals indicative of the number of seeds determined as passing through the respective seed tube during the given interval of time to the master unit, said means to convey including only a single data line using multiple cables in serial connection.

2. The apparatus according to claim 1, wherein the means to form a beam of light includes a light source and an optical fiber, the light source and the detector means being affixed to a common circuit board.

3. The apparatus according to claim 1, wherein the means to form a beam of light includes a light source, said light source being positioned opposite a seed sensing area of the seed tube from the detector means.

4. The apparatus according to claim 1, wherein the means to form a beam of light includes a means to form a substantially uniform, collimated light beam which illuminates the sensing area of the associated seed tube.

5. The apparatus according to claim 1, wherein the means to form a beam of light is controlled to adjust the light beam intensity for the type or size of the seed being monitored.

6. The apparatus according to claim 1, wherein the processor means adjusts the level of amplification of the electrical signal that is received by said processor means, or the level of the signal that is A/D converted and received by said processor means, prior to determining therefrom the number of seeds passing through the seed tube during a given interval of time.

7. The seed planter monitoring system as set forth in claim 1, wherein said multiple cables are of uniform length.

8. In a seed planter monitoring system having a master unit, and a respective light emitter and optical sensor associated with respective seed tubes of an agricultural planter, the improvement of:

digital processor means, associated with respective ones of two or more seed tubes, for processing a signal representative of the output of said optical sensor and determining a seed rate passing through said seed tube therefrom; and means to convey digital signals indicative of the seed rates determined by the respective digital processor means to the master unit, said means to convey including only a single data line using multiple cables in serial connection.

9. The apparatus according to claim 8, wherein the respective light emitters comprise respective means to form a uniform, collimated beam of light that illuminates a sensing area of the respective seed tube.

10. The apparatus according to claim 8, wherein said digital processor means controls the light intensity produced by the respective light emitter so as to adjust for size or type of seed being monitored.

11. The apparatus according to claim 8, wherein said digital processor means controls the amplification level of the signal received from said optical sensor so as to adjust for changes in light output by the light emitter, size or type of seed being monitored, accumulation of dust or dirt, or loss of sensitivity of the detector means.

12. The seed planter monitoring system as set forth in claim 8, wherein said multiple cables are of uniform length.

* * * * *